(12) United States Patent
Aoki

(10) Patent No.: US 9,828,057 B2
(45) Date of Patent: Nov. 28, 2017

(54) FRONT WHEEL SUPPORTING FRAME STRUCTURE OF SADDLE-RIDE VEHICLE

(71) Applicant: HONDA MOTOR CO., LTD., Tokyo (JP)

(72) Inventor: Koji Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/077,908

(22) Filed: Mar. 23, 2016

(65) Prior Publication Data

US 2016/0288868 A1 Oct. 6, 2016

(30) Foreign Application Priority Data

Mar. 30, 2015 (JP) .................................. 2015-068427

(51) Int. Cl.
*B62K 11/12* (2006.01)
*B62K 11/04* (2006.01)

(52) U.S. Cl.
CPC ............. *B62K 11/12* (2013.01); *B62K 11/04* (2013.01)

(58) Field of Classification Search
CPC ........ B62K 25/08; B62K 25/16; B62K 21/02; B62K 11/12; B62K 11/04
See application file for complete search history.

(56) References Cited

U.S. PATENT DOCUMENTS

| 913,961 | A | * | 3/1909 | Levedahl | B62K 25/24 280/276 |
|---|---|---|---|---|---|
| 1,729,926 | A | * | 10/1929 | Brusselbach | B62K 21/08 280/279 |
| 5,069,467 | A | * | 12/1991 | Claudio | B62K 25/24 280/276 |
| 8,162,342 | B2 | * | 4/2012 | Chen | B62K 25/24 280/276 |
| 9,359,037 | B2 | * | 6/2016 | Kuwabara | B62K 25/24 |
| 2004/0140644 | A1 | * | 7/2004 | Kofuji | B62K 25/16 280/276 |
| 2008/0315550 | A1 | * | 12/2008 | Parker | B62K 21/00 280/276 |
| 2015/0274250 | A1 | * | 10/2015 | Kuwabara | B62K 25/24 280/276 |

FOREIGN PATENT DOCUMENTS

| JP | 2004-276795 | 10/2004 |
|---|---|---|
| JP | 2011-201335 | 10/2011 |

\* cited by examiner

*Primary Examiner* — Joseph M Rocca
*Assistant Examiner* — Marlon A Arce
(74) *Attorney, Agent, or Firm* — Mori & Ward, LLP

(57) ABSTRACT

A cushion member is swingable with respect to a main frame about a fourth rotation axis to be expanded and compressed according to a movement of a front wheel. A first arm is swingable with respect to a front fork supporting member about a fifth rotation axis and with respect to the main frame about a sixth rotation axis. A second arm is swingable with respect to the front fork supporting member about a seventh rotation axis, with respect to the cushion member about an eighth rotation axis, and with respect to the main frame about a ninth rotation axis. The fourth to ninth rotation axes are substantially parallel to one another. The fourth rotation axis is provided to be substantially perpendicular to a plane including a second rotation axis about which the front fork is turnable.

20 Claims, 7 Drawing Sheets

FRONT WHEEL SUPPORTING FRAME STRUCTURE OF SADDLE-RIDE VEHICLE

CROSS-REFERENCE TO RELATED APPLICATIONS

The present application claims priority under 35 U. S. C. §119 to Japanese Patent Application No. 2015-068427, filed Mar. 30, 2015. The contents of this application are incorporated herein by reference in their entirety.

BACKGROUND OF THE INVENTION

Field of the Invention

The present invention relates to a front wheel supporting frame structure of a saddle-ride vehicle.

Discussion of the Background

Conventional front wheel supporting frame structures of saddle-ride type vehicles include ones disclosed in, for example, Japanese Unexamined Patent Application Publication No. 2011-201335 and Japanese Unexamined Patent Application Publication No. 2004-276795. The front wheel supporting frame structure disclosed in Japanese Unexamined Patent Application Publication No. 2011-201335 includes main frames which extend in vehicle front-rear directions, upper and lower arms which extend in the vehicle front-rear directions and by which a front wheel is supported to be swingable in up-down directions, a cushion member which is expanded and compressed according to a movement of the front wheel to provide a cushioning effect, and a handle supporting portion which supports a handle, in which an upper end portion of the cushion member is connected to front portions of the main frames, a lower end portion of the cushion member is connected to the lower arm, and the handle supporting portion is arranged in front of the center axis of the cushion member in a side view. Meanwhile, the front wheel supporting frame structure disclosed in Japanese Unexamined Patent Application Publication No. 2004-276795 has a configuration including a cushion member arranged on a turning axis of a front fork, in which a handle supporting portion is arranged on the center axis of the cushion member in a side view.

SUMMARY OF THE INVENTION

According to one aspect of the present invention, a front wheel supporting frame structure of a saddle-ride type vehicle, includes: a main frame which extends in vehicle front-rear directions; upper and lower arms which extend in the vehicle front-rear directions and by which a front wheel is supported to be swingable in up-down directions; and a cushion member which is expanded and compressed according to a movement of the front wheel to provide a cushioning effect, wherein an upper connection portion to which a rear end portion of the upper arm (21) is swingably connected is formed in an upper front portion of the main frame, a lower connection portion to which a rear end portion of the lower arm is swingably connected is formed in a lower front portion of the main frame, a handle supporting portion by which a handle is supported to be turnable about a steering axis is formed to extend upward in the upper front portion of the main frame, behind the upper connection portion, an upper end portion of the cushion member is swingably connected to the handle supporting portion, and a lower end portion of the cushion member is swingably connected to the lower arm.

According to another aspect of the present invention, a front wheel supporting frame structure of a saddle-ride type vehicle includes a front fork, a front fork supporting member, a main frame, a cushion member, a first arm and a second arm. The front fork supports a front wheel to be rotatable around a first rotational axis. The front fork supporting member supports the front fork to be turnable about a second rotational axis. On the main frame, a saddle is disposed. The main frame includes a handle supporting portion disposed between the front fork and the saddle. The handle supporting portion supports a handle post to be turnable about a third rotational axis different from the second rotational axis. The front fork is turnable with the handle post. The cushion member is connected to the main frame at or below the handle supporting portion such that the cushion member is swingable with respect to the main frame about a fourth rotation axis. The fourth rotation axis is provided to be substantially perpendicular to a plane including the second rotation axis. The cushion member is to be expanded and compressed according to a movement of the front wheel. The cushion member has a first cushion end connected to the main frame and a second cushion end opposite to the first cushion end. The first arm is connected to the front fork supporting member at a first front end portion of the first arm such that the first arm is swingable with respect to the front fork supporting member about a fifth rotation axis substantially parallel to the fourth rotation axis. The first arm is connected to the main frame at a first rear end portion of the first arm opposite to the first front end portion such that the first arm is swingable with respect to the main frame about a sixth rotation axis substantially parallel to the fourth rotation axis. The second arm is connected to the front fork supporting member at a second front end portion of the second arm such that the second arm is swingable with respect to the front fork supporting member about a seventh rotation axis substantially parallel to the fourth rotation axis. The second arm is connected to the second cushion end of the cushion member such that the second arm is swingable with respect to the cushion member about an eighth rotation axis substantially parallel to the fourth rotation axis. The second arm is connected to the main frame at a second rear end portion of the second arm opposite to the second front end portion such that the second arm is swingable with respect to the main frame about a ninth rotation axis substantially parallel to the fourth rotation axis.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
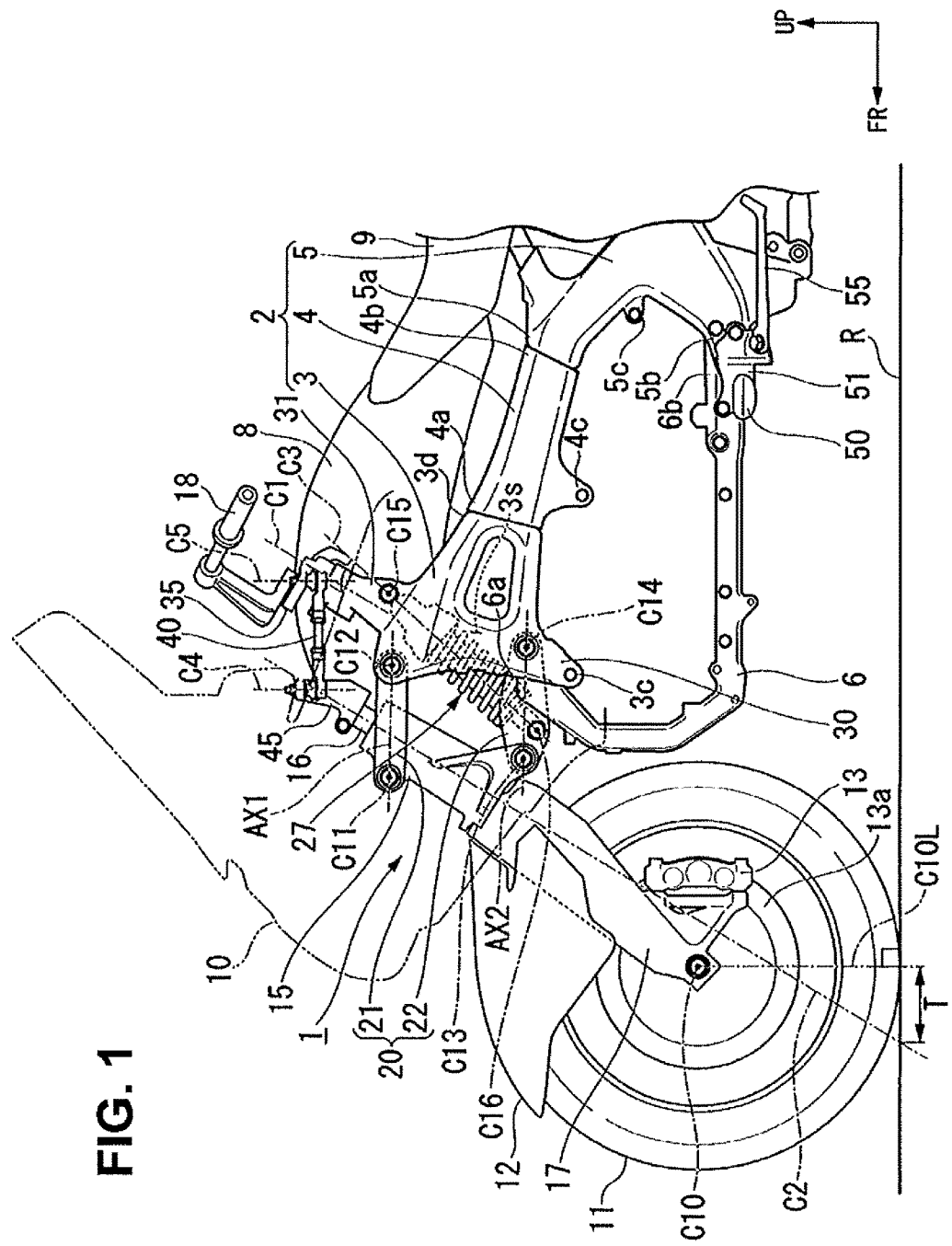
FIG. 1 is a left-side view of a vehicle body front portion of a motorcycle according to an embodiment of the present invention.

The embodiments will now be described with reference to the accompanying drawings, wherein like reference numerals designate corresponding or identical elements throughout the various drawings.

An embodiment of the present invention is described below with reference to the drawings. Directions such as front, rear, left, right, and the like in the following description are the same as directions in a vehicle described below, unless specifically stated otherwise. Moreover, an arrow FR indicating a front side of the vehicle, an arrow LH indicating a left side of the vehicle, an arrow UP indicating an upper side of the vehicle, and a center line CL in vehicle left-right directions are illustrated in appropriate portions of the drawings used in the following description.

<Entire Vehicle>

FIG. 1 illustrates a vehicle body front portion of a motorcycle which is an example of a saddle-ride type vehicle. Referring to FIG. 1, a vehicle body frame of the motorcycle includes a pair of left and right main frames 2 which extend in vehicle front-rear directions and which include front blocks 3 supporting a front wheel suspension device 1 in a front end portion thereof. Reference sign 2L in FIG. 2 denotes the left main frame, and reference sign 2R denotes the right main frame. Moreover, reference sign 3L in FIG. 2 denotes a left front block, and reference sign 3R denotes a right front block.

The left and right main frames 2 each integrally include: the front block 3 formed in a shape whose width in up-down directions increases toward the front side in a side view; a pivot portion 5 supporting a not-illustrated rear suspension device and formed in a V-shape whose width in the up-down directions increases toward the front side and which is open to the front; and a connection portion 4 extending rearward from a rear end 3d of the front block 3 while gently inclining downward and connecting the rear end 3d of the front block 3 and an upper front end 5a of the pivot portion 5 to each other. Note that the width of a front end 4a of the connection portion 4 in the up-down directions is substantially the same as the width of the rear end 3d of the front block 3 in the up-down directions. Moreover, the width of the rear end 4b of the connection portion 4 in the up-down directions is substantially the same as the width of the upper front end 5a of the pivot portion 5 in the up-down directions.

The vehicle body frame further includes a pair of left and right lower frames 6 which have a J-shape in the side view. The lower frames 6 extend forward in a vehicle lower portion from lower front end portions 5b of the pivot portions 5 located in rear portions of the main frames 2, and then extend upward in a vehicle front portion to reach lower front end portions of the front blocks 3. Reference sign 6L in FIG. 2 denotes the left lower frame, and reference sign 6R denotes the right lower frame.

For example, an engine (not illustrated) is mounted in a space surrounded by the main frames 2 and the lower frames 6. A fuel tank 8 is arranged above the front blocks 3 and the connection portions 4. A seat 9 is arranged above the pivot portions 5. The vehicle body front portion of the motorcycle is covered with a front cowl 10 made of synthetic resin.

Figure 2:
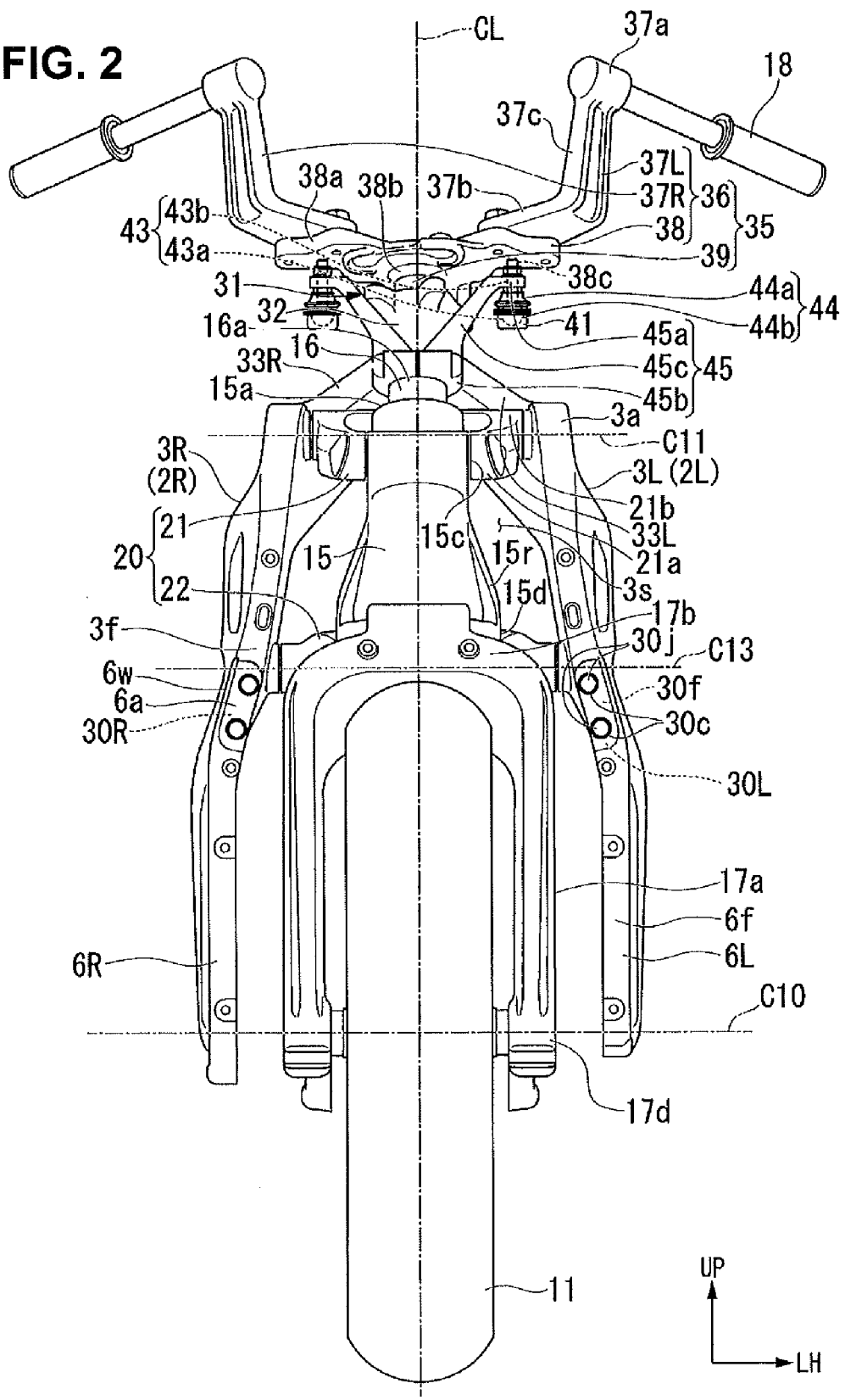
FIG. 2 is a front view of the vehicle body front portion of the aforementioned motorcycle.

Referring also to FIG. 2, a set of the front blocks 3 is formed in a gate shape (inverted V-shape) whose width in the left-right directions decreases toward the upper side in a front view and which is open downward. A lower open portion in the gate shape of the set of front blocks 3 is denoted by reference sign 3s.

Figure 4:
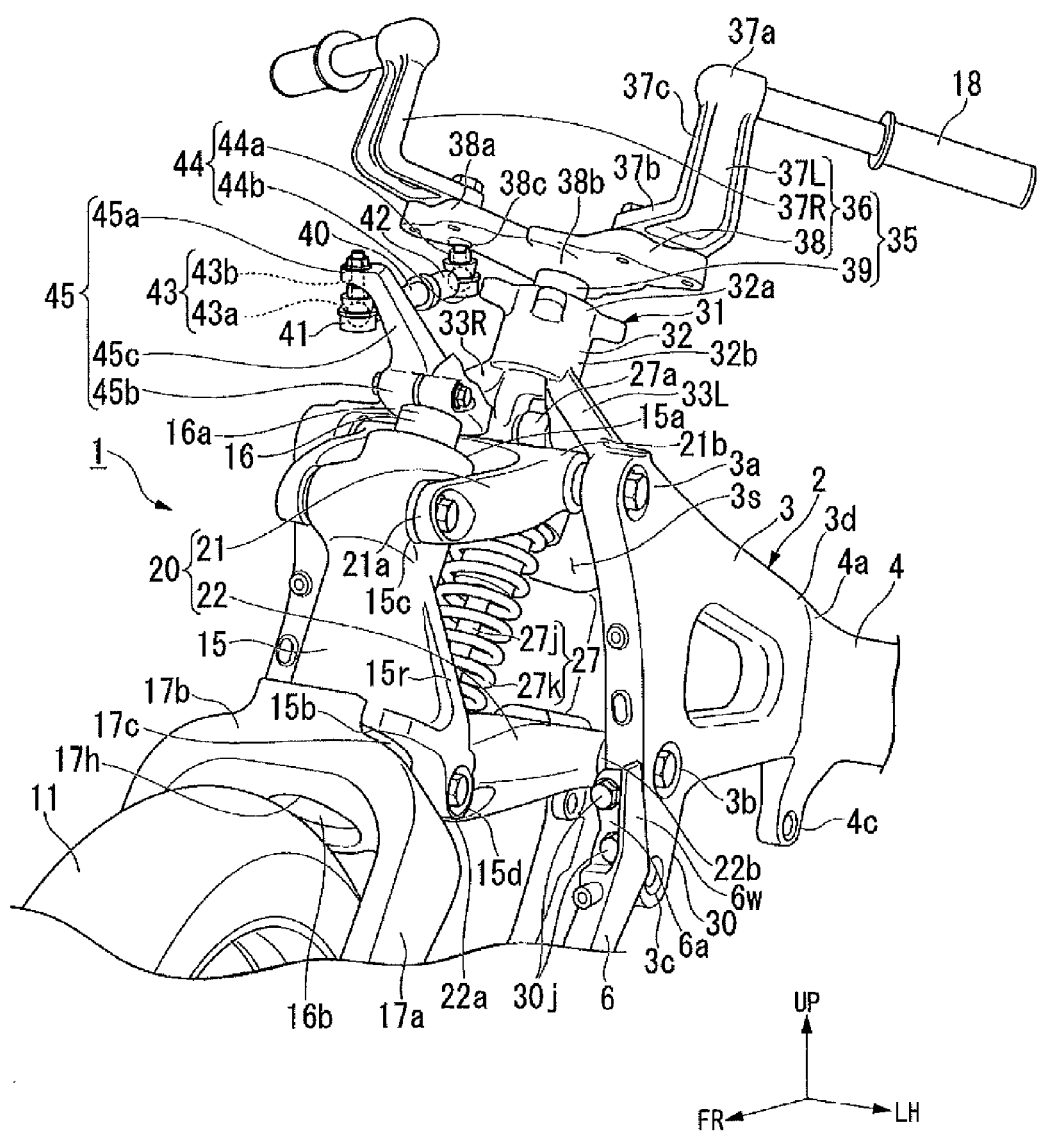
FIG. 4 is a perspective view of a front wheel suspension device of the aforementioned motorcycle as viewed from a front left side of the motorcycle and is a view in which a left link member is omitted.

Referring also to FIG. 4, upper connection portions 3a to which rear end portions 21b of an upper arm 21 are connected are formed in upper front end portions of the front blocks 3. A handle supporting portion 31 supporting a bar handle 18 (handle) is formed in upper front portions of the front blocks 3, behind the upper connection portions 3a, to extend rearward and upward. Extending portions 30 extending forward and downward are formed in lower front portions of the front blocks 3. Reference sign 30L in FIG. 2 denotes a left extending portion, and reference sign 30R denotes a right extending portion.

Lower connection portions 3b to which rear end portions 22b of a lower arm 22 are connected are formed in the extending portions 30, and upper front portions 6a of the lower frames 6 are connected to the extending portions 30. Lower supporting portions 3c supporting left and right upper portions of a front section of the engine are formed in lower end portions of the extending portions 30. Note that left and right upper portions of a center section of the engine in the front-rear directions are supported by supporting portions 4c of the connection portions 4, and left and right portions of a rear section of the engine are supported by supporting portions 5c of the pivot portions 5. Moreover, the lower frames 6 may support the engine.

In the front view, front end portions 6f of the left and right lower frames 6L, 6R linearly extend from a lower portion to an upper portion of the vehicle, and then incline toward the center in the vehicle width directions as extending upward to reach the upper front portions 6a. The upper front portions 6a of the left and right lower frames 6L, 6R overlap front portions 30f of the left and right extending portions 30L, 30R in the front view. The front portions 30f of the left and right extending portions 30L, 30R incline toward the center in the vehicle width directions as extending upward in the front view. Front end portions 3f of the left and right front blocks 3L, 3R are continuous with upper ends of the front portions 30f of the left and right extending portions 30L, 30R and gently incline toward the center in the vehicle width directions as extending upward in the front view.

The upper front portions 6a of the lower frames 6 are joined to the front portions 30f of the extending portions 30. Joining portions 30c to which the upper front portions 6a of the lower frames 6 are joined are formed in the front portions 30f of the extending portions 30. The upper front portions 6a of the lower frames 6 are joined to the joining portions 30c by using bolts 30j serving as fasteners for fastening the upper front portions 6a from the front side of the vehicle.

The multiple bolts 30j are provided while being offset from one another in the up-down directions and the left-right directions in the front view. In the embodiment, two bolts 30j are provided in each of the joining portions 30c of the left and right extending portions 30L, 30R to be offset from each other in the up-down directions and the left-right directions in the front view. Note that three or more bolts 30j may be provided.

Side wall portions 6w covering lateral sides of the bolts 30j in the side views are provided integrally with the upper front portions 6a of the lower frames 6. The side wall portions 6w are formed in plate shapes whose thickness direction coincides with the vehicle width directions, and extend in the front-rear directions. Covering the bolts 30j with the side wall portions 6w in the side views makes the joining portions 30c between the upper front portions 6a of the lower frames 6 and the front portions 30f of the extending portions 30 less visible in the side views, and the external appearance can be thereby improved.

Note that reference sign 50 in FIG. 1 denotes a step, reference sign 51 denotes a step supporting member 51 supporting the step 50, and reference sign 55 denotes a side stand.

<Front Wheel Suspension Device>

Referring also to FIGS. 1 and 4, the front wheel suspension device 1 includes: a front fork 17 which supports a front wheel 11 in a lower end portion thereof; a handle post 35 which is turnably supported by the handle supporting portion 31 and which is turned about a steering axis C1 with an operation of the bar handle 18; a supporting member 15 (member) by which the front fork 17 is supported to be turnable about a steered axis C2; link members 40 and a steering member 45 which are connected to each other between the handle post 35 and the supporting member 15; a supporting arm 20 including the upper and lower arms 21, 22 which extend in the vehicle front-rear directions and by which the front wheel 11 is supported to be swingable in the up-down directions; and a cushion member 27 which is expanded and compressed according to a movement of the front wheel 11 to provide a cushioning effect. The turning about the steering axis C1 with an operation of the bar handle 18 and the steering of the front wheel 11 are linked to each other via the handle post 35, the link members 40, the steering member 45, the supporting member 15, and the front fork 17.

The steering axis C1 is the center of turning of the handle post 35 which is turned with an operation of the bar handle 18, and coincides with the center axis of a cylindrical boss portion 32 in the handle supporting portion 31. The steered axis C2 (turning axis) is the center of turning of the front fork 17 which is turned with an operation of the bar handle 18, and coincides with the center axis of the cylindrical supporting member 15. An angle of the steered axis C2 with respect to the vertical direction is the "caster angle." The steered axis C2 is offset (spaced away) from the steering axis C1 toward the front side in the side view. The steered axis C2 and the steering axis C1 are substantially parallel to each other.

<Front Fork>

The front fork 17 integrally includes a shaft portion 16 forming the steered axis C2, a pair of left and right arm portions 17a extending in the up-down directions, and a cross member 17b connecting upper end portions of the left and right arm portions 17a to each other. The left and right arm portions 17a are arranged respectively on left and right sides of the front wheel 11. The cross member 17b curves inward in the vehicle width directions along a tread surface of the front wheel 11 at an upper end thereof, and is arranged between the upper end portions of the left and right arm portions 17a. Left and right end portions of the cross member 17b are joined to the upper end portions of the left and right arm portions 17a. The elements of the front fork 17 are made of, for example, integral aluminum parts and are welded into one part.

The shaft portion 16 of the front fork 17 is supported by the cylindrical supporting member 15, inside the supporting member 15 in a radial direction thereof, to be turnable about the steered axis C2. An upper end portion 16a of the shaft portion 16 of the front fork 17 is connected to the steering member 45.

A shaft supporting portion 17c to which a lower end portion 16b of the shaft portion 16 is connected is formed in an upper end portion of the cross member 17b. An insertion hole 17h opened in a direction in which the shaft portion 16 extends is formed in the shaft supporting portion 17c of the cross member 17b. The shaft portion 16 is inserted into the insertion hole 17h from the upper end portion 16a, and the lower end portion 16b of the shaft portion 16 and the shaft supporting portion 17c are welded together with the lower end portion 16b of the shaft portion 16 located in the insertion hole 17h. The upper end portion of the cross member 17b is thereby fixed to the lower end portion 16b of the shaft portion 16.

Referring also to FIG. 2, an axle of the front wheel 11 (hereafter, referred to as "front axle") is connected to lower end portions 17d of the left and right arm portions 17a. For example, both end portions of the front axle in the vehicle width directions are fixed to the lower end portions 17d of the left and right arm portions 17a via not-illustrated ball bearings, respectively. A wheel of the front wheel 11 is supported by a center portion of the front axle in the vehicle width directions to be rotatable. A front fender 12 (see FIG. 1) is supported on the cross member 17b via not-illustrated bolts. The illustration of the front fender 12 and the like are omitted in FIGS. 2 and 4 for convenience.

Note that reference sign 13 in FIG. 1 denotes a brake caliper. Reference sign 13a denotes a brake rotor. Reference sign C10 denotes the center axis of the front axle. Reference sign C10L denotes a vertical line extending from the center axis C10 to a road surface R. Reference sign T denotes a trail.

<Handle Supporting Portion>

The handle supporting portion 31 is provided in the upper front end portions of the front blocks 3 to be inclined rearward relative to the vertical direction in the side view. The handle supporting portion 31 is provided integrally with upper end portions of the front blocks 3 made of, for example, aluminum. The handle supporting portion 31 supports the handle post 35 such that the handle post 35 is turnable (steerable).

Specifically, the handle supporting portion 31 is formed of: the cylindrical boss portion 32 which forms the steering axis C1; and left and right extending portions 33L, 33R which extend upward and rearward from the upper front end portions of the front blocks 3 as inclining inward in the vehicle width directions to be connected to a lower end portion 32b (lower portion) of the boss portion 32. A bolt 34a (see FIG. 5) extending in the vehicle width directions and serving as a connection shaft connecting the left and right extending portions 33L, 33R to each other is provided in the left and right extending portions 33L, 33R. Cushion upper connection portions 27c (see FIG. 5) to which an upper end portion 27a (a first cushion end 27a) of the cushion member 27 is connected are formed in the left and right extending portions 33L, 33R. The handle post 35 is provided in an upper end portion 32a (upper portion) of the boss portion 32 to be turnable about the steering axis C1.

<Handle Post>

Figure 3:
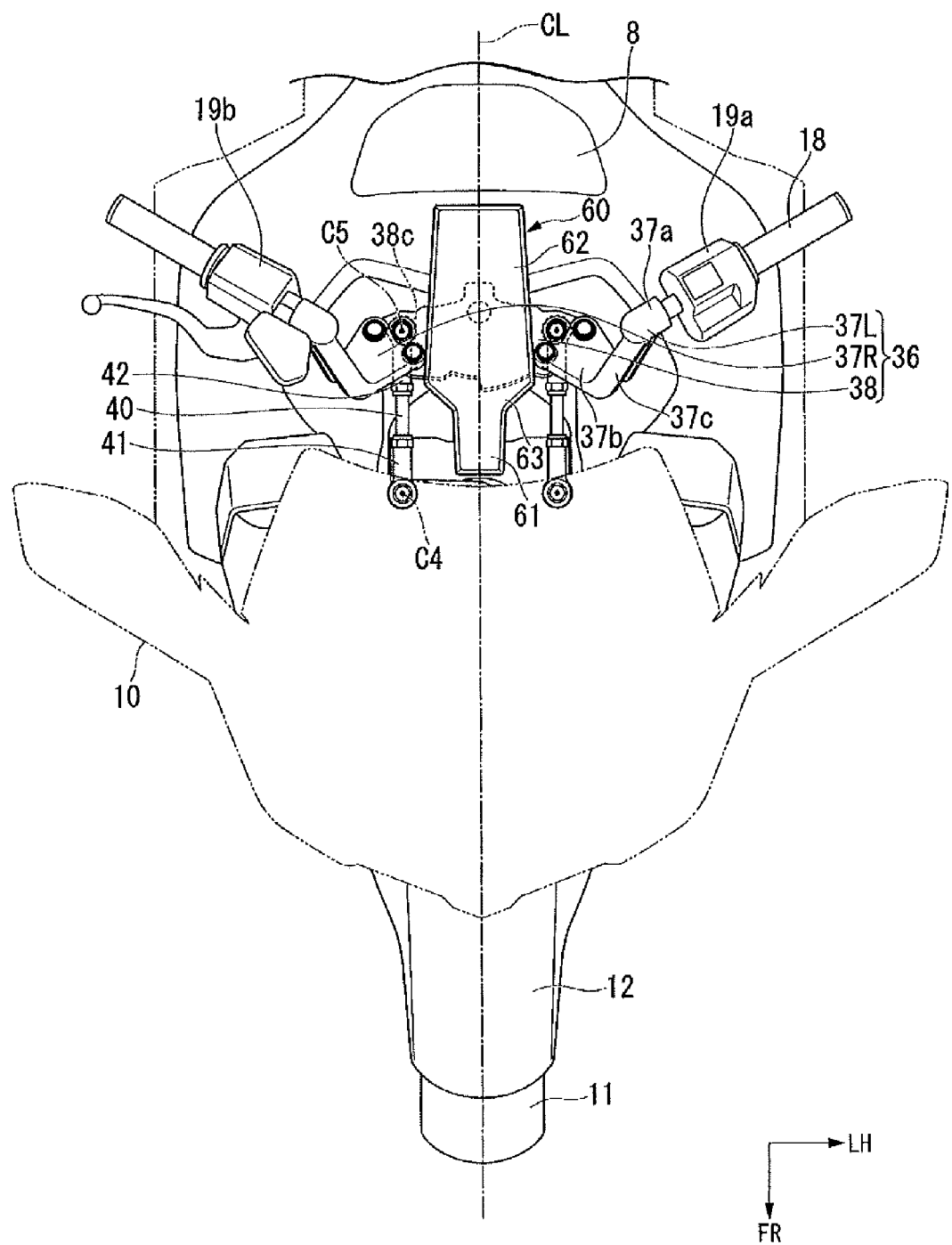
FIG. 3 is a top view of the vehicle front portion of the aforementioned motorcycle.

The handle post 35 is formed of: a holder 36 to which the bar handle 18 is fixed; and a cylindrical shaft portion 39 which is connected to a lower portion of the holder 36 and whose center axis coincides with the steering axis C1. Referring also to FIG. 3, the holder 36 is formed in a W-shape in a top view. The holder 36 has: a base portion 38 whose thickness direction is parallel to the steering axis C1 and which is formed in such a fan shape that its width in the left-right directions increases toward the front side; and left and right extending portions 37L, 37R which are connected to left and right end portions of the base portion 38 and which extend rearward and upward to be formed in an L-shape in the side view.

The shaft portion 39 is supported by the boss portion 32, inside the boss portion 32 in a radial direction thereof, to be turnable about the steering axis C1. A rear portion 38b of the base portion 38 is welded to an upper end portion of the shaft portion 39. Link rear connection portions 38c to which rear end portions of the pair of left and right link members 40 are connected are formed in bottom surfaces of left and right portions of the base portion 38.

Each of the left and right extending portions 37L, 37R integrally includes: a handle connection portion 37a to which an end portion of the bar handle 18 on the inner side in the vehicle width directions is connected; a first extending portion 37b which is connected to a corresponding one of left and right end portions 38a of the base portion 38 and which extends forward and upward in the side view along the inclination of the base portion 38; and a second extending portion 37c which extends rearward and upward from an upper front end of the first extending portion 37b to be connected to the handle connection portion 37a.

The bar handle 18 and the left and right extending portions 37L, 37R are, for example, aluminum parts and are welded together into one part. For example, the bar handle 18 includes left and right separated handles which are separated into two parts in the vehicle width directions, and portions of the left and right separated handles on the inner sides in the vehicle width directions are welded to the handle connection portions 37a of the left and right extending portions 37L, 37R. Note that the bar handle 18 and the left and right extending portions 37L, 37R may be integrated in such a way that insertion holes extending in the vehicle width directions are formed in the handle connection portions 37a and the portions of the left and right separated handles on the inner sides in the vehicle width directions are press fitted into the insertion holes.

The second extending portions 37c of the left and right extending portions 37L, 37R are fastened and fixed to the left and right end portions 38a of the base portion 38 by multiple (for example, two on each of left and right sides in the embodiment) fastening members (bolts). Note that the second extending portions 37c of the left and right extending portions 37L, 37R may be welded to the left and right end portions 38a of the base portion 38.

The shaft portion 39 of the handle post 35 being turnably supported by the boss portion 32 enables the handle post 35 to be turned (steered) about the steering axis C1 with an operation of the bar handle 18.

Note that reference sign 19a in FIG. 3 denotes a switch box including switches such as a dimmer switch and a turn signal switch. Reference sign 19b denotes a master cylinder connected to a brake lever. Illustration of a clutch lever is omitted. Furthermore, the motorcycle may employ an automatic clutch.

<Cover Member>

A cover member 60 covering a portion above the handle post 35 in the top view is provided above the handle post 35. The cover member 60 is made of, for example, synthetic resin and integrally includes: a first cover portion 61 formed in a rectangular shape extending in the front-rear directions in the top view; a second cover portion 62 provided behind the first cover portion 61 and formed in a rectangular shape extending in the front-rear directions in the top view; and a connection portion 63 connecting a rear portion of the first cover portion 61 and a front portion of the second cover portion 62 to each other.

Specifically, the first cover portion 61 extends in the front-rear directions in the top view (to be more specific, extends along the center line CL in the vehicle left-right directions such that the width of the first cover portion 61 in the left-right directions gradually increases toward the rear side in the top view) to reach the connection portion 63. The second cover portion 62 extends in the front-rear directions in the top view (to be more specific, extends along the center line CL in the vehicle left-right directions such that the width of the second cover portion 62 gradually increases toward the front side) to reach the connection portion 63. The second cover portion 62 is located inside the left and right extending portions 37L, 37R in the vehicle width directions in the top view and covers the portion above the base portion 38. The connection portion 63 is formed in a trapezoid shape whose width in the left-right directions increases toward the rear side in the top view, and connects the rear end of the first cover portion 61 and the front end of the second cover portion 62.

<Supporting Member>

Referring also to FIGS. 1 and 4, the supporting member 15 is provided in front of and away from the steering axis C1. Specifically, the supporting member 15 is formed in a cylindrical shape and is provided in front of the front blocks 3 to be inclined rearward with respect to the vertical direction. The inside of the supporting member 15 in the radial direction supports the shaft portion 16 of the front fork 17 such that the shaft portion 16 is turnable (steerable) about the steered axis C2. The upper end portion 16a of the shaft portion 16 protrudes upward beyond an upper end portion 15a of the supporting member 15. Note that the center axes of the shaft portion 16 and the supporting member 15 coincide with the steered axis C2.

An upper connection portion 15c to which front end portions 21a of the upper arm 21 are connected is formed in an upper front portion of the supporting member 15 to protrude forward and upward. Lower connection portions 15d to which front end portions 22a of the lower arm 22 are connected are formed in a lower rear portion of the supporting member 15 to protrude rearward and downward. The upper connection portion 15c is arranged in front of the steered axis C2 in the side view, while the lower connection portions 15d are arranged behind the steered axis C2 in the side view. Ribs 15r for reinforcing the lower connection portions 15d are formed on left and right surfaces of the supporting member 15. The ribs 15r are each formed in a V-shape open upward and to the front in the side view, and branch from the lower connection portions 15d to extend forward and upward such that the height of the ribs increases toward the lower connection portions 15d.

<Steering Member>

The steering member 45 is supported by the upper end portion 16a of the shaft portion 16, above the upper end portion 15a of the supporting member 15. Referring to FIGS. 1 to 4, the steering member 45 integrally includes:

link front connection portions 45*a* to which front end portions of the link members 40 are connected; a shaft supporting portion 45*b* which is formed in a C-shape open to the front as viewed in the direction of the steered axis C2; and connection portions 45*c* which extend upward from an upper end of the shaft supporting portion 45*b* as inclining outward in the vehicle width directions and which connect the link front connection portions 45*a* and the shaft supporting portion 45*b* to each other. The link front connection portions 45*a*, the shaft supporting portion 45*b*, and the connection portions 45*c* are, for example, aluminum parts and are formed integrally.

Referring to FIGS. 1 to 4, in the embodiment, the connection portions 45*c* extend upward from left and right upper ends of the shaft supporting portion 45*b* as inclining outward in the vehicle width directions, and reach the link front connection portions 45*a*. In FIG. 4, illustration of the left link member 40 is omitted for convenience.

An insertion hole opened in the vehicle width directions is formed in a front end portion of the shaft supporting portion 45*b*. For example, the steering member 45 is fastened and fixed to the upper end portion 16*a* of the shaft portion 16 by screwing and fastening a bolt to a nut through the insertion hole with the upper end portion 16*a* of the shaft portion 16 inserted into the shaft supporting portion 45*b*. The steering member 45 can be turned (steered) about the steered axis C2 together with the front fork 17 with an operation of the bar handle 18.

<Link Member>

The link members 40 have linear shapes extending in the front-rear directions in the side view and the top view. The link members 40 are provided on the left and right sides in the vehicle width directions. Front ball joints 41 connected to the link front connection portions 45*a* are provided in the front end portions of the link members 40. Rear ball joints 42 connected to the link rear connection portions 38*c* are provided in the rear end portions of the link members 40.

The front and rear ball joints 41, 42 each include a ball stud 43 and a socket 44. The ball stud 43 includes a spherical ball portion 43*a* and a stud portion 43*b* protruding above the ball portion 43*a*. The ball portion 43*a* is slidably held inside the socket 44. The stud portion 43*b* extends linearly in the vehicle up-down directions. The socket 44 includes upper and lower sockets 44*a*, 44*b*. The ball portion 43*a* is slidably held between the upper and lower sockets 44*a*, 44*b*.

Insertion holes opened in the vehicle up-down directions are formed in the link front connection portions 45*a*. The stud portions 43*b* of the front ball joints 41 are fastened and fixed to the link front connection portions 45*a* by inserting screw portions, provided in upper end portions of the stud portions 43*b* of the front ball joints 41, into the insertion holes of the link front connection portions 45*a* and screwing and fasting nuts to the screw portions protruding above the link front connection portions 45*a*. Hereafter, the center axes of the stud portions 43*b* in the front ball joints 41 are referred to as "first axes C4." The front end portions of the link members 40 are connected to the link front connection portions 45*a* via the front ball joints 41 to be turnable about the first axes C4.

Insertion holes opened in the vehicle up-down directions are formed in the link rear connection portions 38*c*. The stud portions 43*b* of the rear ball joints 42 are fastened and fixed to the link rear connection portions 38*c* by inserting screw portions, provided in upper end portions of the stud portions 43*b* of the rear ball joints 42, into the insertion holes of the link rear connection portions 38*c* and screwing and fasting nuts to the screw portions protruding above the link rear connection portions 38*c*. Hereafter, the center axes of the stud portions 43*b* in the rear ball joints 42 are referred to as "second axes C5." The rear end portions of the link members 40 are connected to the link rear connection portions 38*c* via the rear ball joints 42 to be turnable about the second axes C5.

For example, each of the link members 40 has screw portions in the front and rear end portions and is fixed by using lock nuts such that the front and rear screw portions are screwed at predetermined screwing amounts respectively to a rear end portion of the lower socket 44*b* of the front ball joint 41 and a front end portion of the lower socket 44*b* of the rear ball joint 42. This enables adjustment of the distance between front and rear connection portions of the link member 40 by fastening or loosening the lock nuts to increase or decrease the screwing amounts of the lower sockets 44*b* and the screw portions.

<Supporting Arm>

The supporting arm 20 includes the upper and lower arms 21, 22 extending in the vehicle front-rear directions and provided to be swingable in the up-down directions. The upper and lower arms 21, 22 are arranged one on top of another in the vehicle up-down directions to extend in the vehicle front-rear directions. The front end portions 21*a* of the upper arm 21 are arranged outside the upper portion of the supporting member 15 in the vehicle width directions, and the front end portions 22*a* of the lower arm 22 are arranged inside the lower portions of the supporting member 15 in the vehicle width directions. The rear end portions 21*b*, 22*b* of the upper and lower arms 21, 22 are arranged inside front portions of the front blocks 3 in the vehicle width directions. The rear end portions 21*b*, 22*b* of the upper and lower arms 21, 22 are housed inside the gate-shaped lower open portion 3*s* in the front blocks 3.

In the side view, the front and rear end portions 21*a*, 21*b* of the upper arm 21 are arranged in front of the front and rear end portions 22*a*, 22*b* of the lower arm 22, respectively. In the side view, the front end portions 21*a* of the upper arm 21 are located in front of the steered axis C2, and the front end portions 22*a* of the lower arm 22 is located behind the steered axis C2. The rear end portions 21*b*, 22*b* of the upper and lower arms 21, 22 are swingably supported by the front portions of the front blocks 3. The supporting member 15 is swingably connected to the front end portions 21*a*, 22*a* of the upper and lower arms 21, 22.

Figure 5:
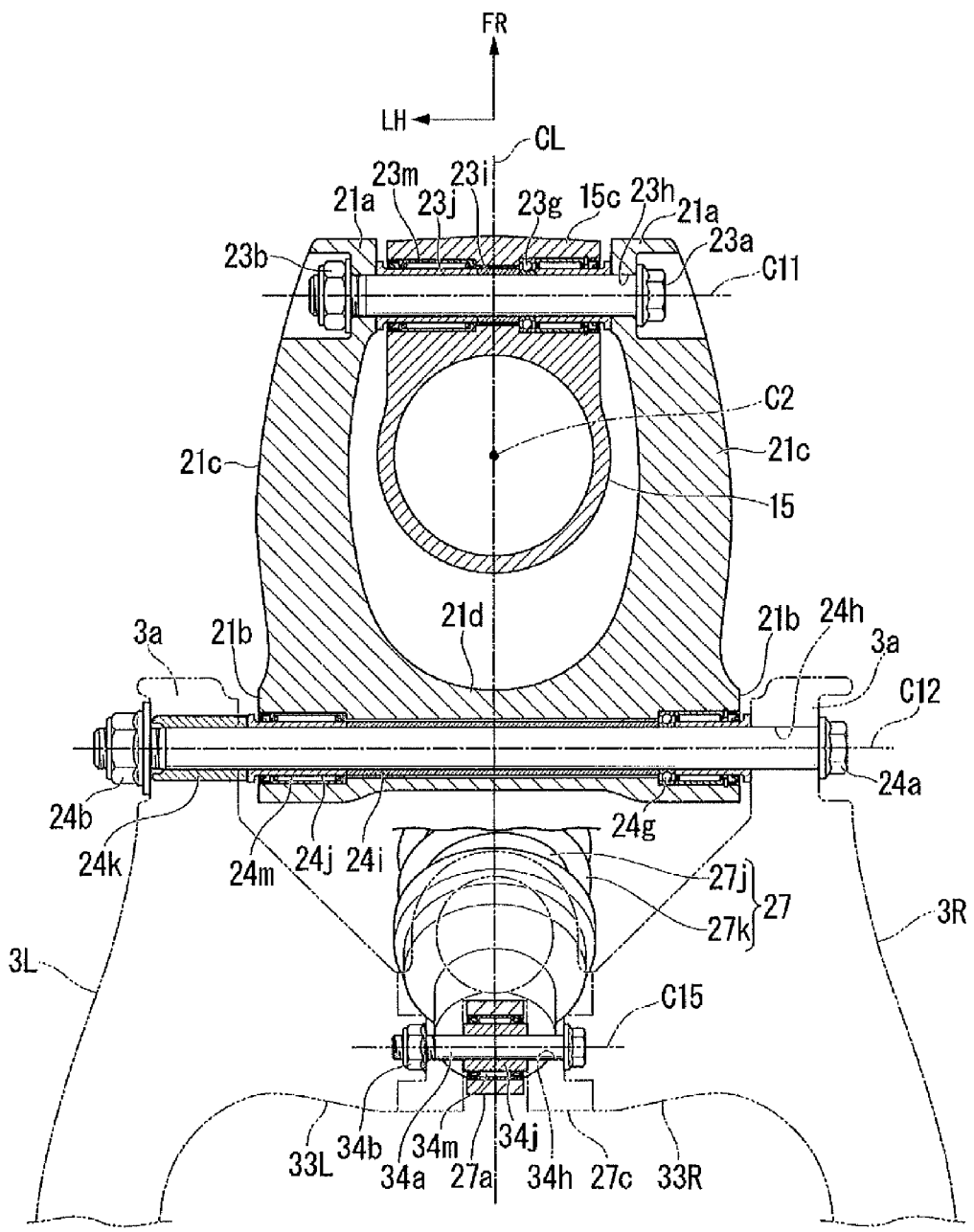
FIG. 5 is a cross-sectional view including a cross section along a first connection axis of an upper arm of the aforementioned front wheel suspension device, a cross section along a second connection axis of the upper arm, and a cross section along the center axis of a connection portion for an upper end portion of a cushion member.
Figure 6:
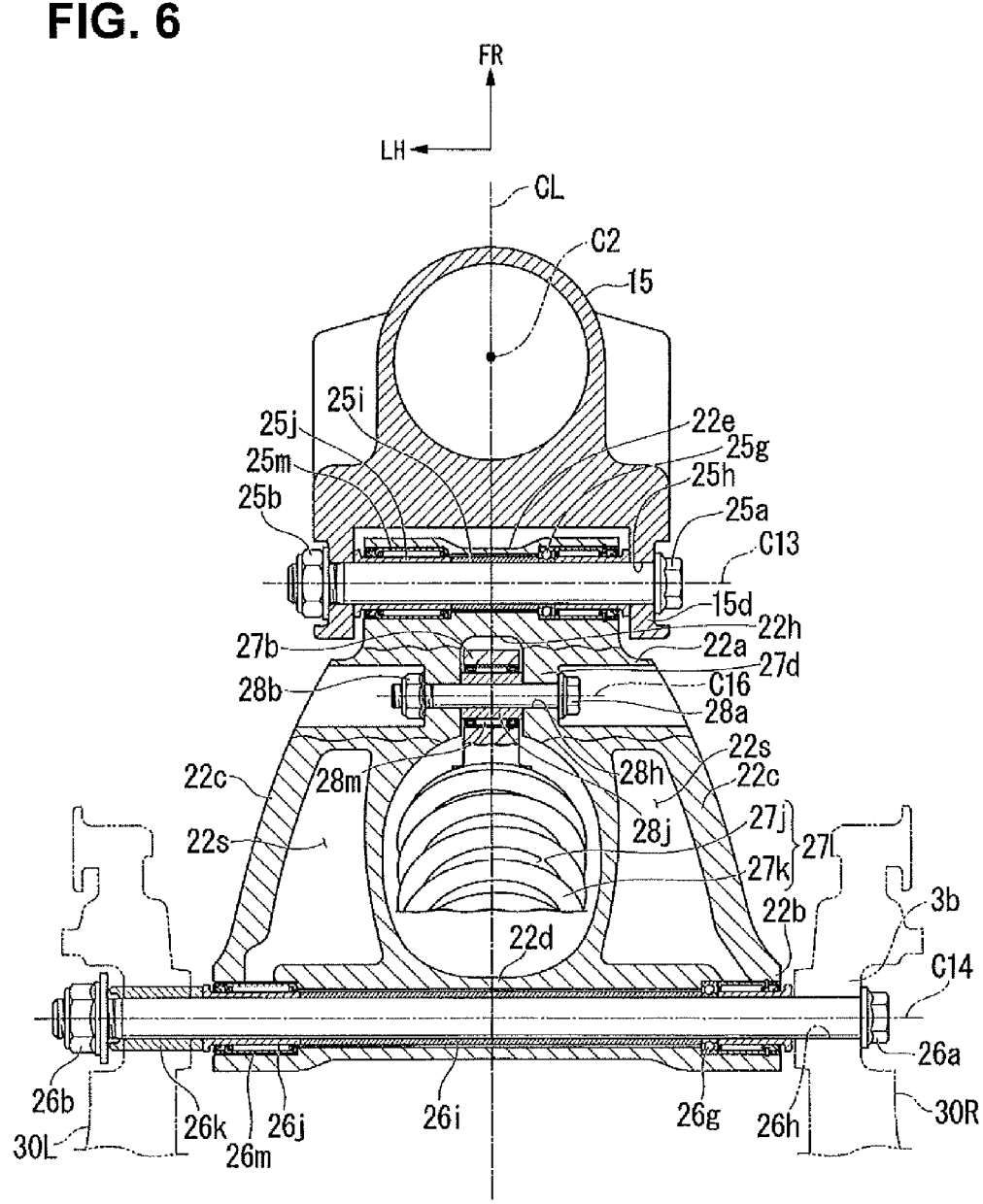
FIG. 6 is a cross-sectional view including a cross section along a third connection axis of a lower arm of the aforementioned front wheel suspension device, a cross section along a fourth connection axis of the lower arm, and a cross section along the center axis of a connection portion for a lower end portion of the cushion member.

Referring also to FIGS. 5 and 6, the upper and lower connection portions 15*c*, 15*d* of the supporting member 15 are swingably connected to the front end portions 21*a*, 22*a* of the upper and lower arms 21, 22 via bolts 23*a*, 25*a* serving as connection shafts extending in the vehicle width directions. The bolt 23*a* penetrates the upper connection portion 15*c* of the supporting member 15 and the front end portions 21*a* of the upper arm 21 and extends in the vehicle width directions. The bolt 25*a* penetrates the lower connection portions 15*d* of the supporting member 15 and the front end portions 22*a* of the lower arm 22 and extends in the vehicle width directions. Reference sign C11 in the drawings denotes the center axis of the bolt 23*a* connecting the upper connection portion 15*c* of the supporting member 15 and the front end portions 21*a* of the upper arm 21 to each other. Reference sign C13 in the drawings denotes the center axis of the bolt 25*a* connecting the lower connection portions 15*d* of the supporting member 15 and the front end portions 22*a* of the lower arm 22 to each other.

The rear end portions 21*b*, 22*b* of the upper and lower arms 21, 22 are swingably connected to the upper and lower connection portions 3*a*, 3*b* of the front blocks 3 via bolts 24a, 26a serving as connection shafts extending in the vehicle width directions. The bolt 24a penetrates the rear end portions 21b of the upper arm 21 and the upper connection portions 3a of the front blocks 3 and extends in the vehicle width directions. The bolt 26a penetrates the rear end portions 22b of the lower arm 22 and the lower connection portions 3b of the left and right extending portions 30L, 30R and extends in the vehicle width directions. The rear end portions 21b, 22b of the upper and lower arms 21, 22 being turnably supported via the bolts 24a, 26a penetrating the front blocks 3 and extending in the vehicle width directions enables the upper and lower arms 21, 22 to be supported with high stiffness. Reference sign C12 in the drawings denotes the center axis of the bolt 24a connecting the rear end portions 21b of the upper arm 21 and the upper connection portions 3a of the front blocks 3 to each other. Reference sign C14 in the drawings denotes the center axis of the bolt 26a connecting the rear end portions 22b of the lower arm 22 and the lower connection portions 3b of the left and right extending portions 30L, 30R to each other.

Hereafter, the center axis of the bolt 23a is referred to as "first connection axis C11," the center axis of the bolt 24a as "second connection axis C12," the center axis of the bolt 25a as "third connection axis C13," and the center axis of the bolt 26a as "fourth connection axis C14."

Referring also to FIG. 1, a straight line passing through the first connection axis C11 and the second connection axis C12 in the side view is referred to as "first straight line AX1," and a straight line passing through the third connection axis C13 and the fourth connection axis C14 in the side view is referred to as "second straight line AX2." The first straight line AX1 of the upper arm 21 and the second straight line AX2 of the lower arm 22 are substantially parallel in the side view.

In the side view, the length of the upper arm 21 in the front-rear directions is substantially the same as the length of the lower arm 22 in the front-rear directions. In other words, the length of a segment connecting the first connection axis C11 and the second connection axis C12 and the length of a segment connecting the third connection axis C13 and the fourth connection axis C14 are substantially the same in the side view. Due to this configuration, the supporting member 15 moves in the up-down directions substantially parallel to the swinging of the upper and lower arms 21, 22 in the up-down directions. Note that the upper and lower arms 21, 22 may be installed such that the supporting member 15 moves while inclining with respect to the swinging of the upper and lower arms 21, 22 in the up-down directions.

The rear end portions 21b (second connection axis C12) of the upper arm 21 and the rear end portions 22b (fourth connection axis C14) of the lower arm 22 are arranged between the steered axis C2 and a stroke axis C3 to be described later in the side view.

<Upper Arm>

Referring also to FIG. 5, the upper arm 21 integrally includes a pair of left and right arm main bodies 21c extending in the front-rear directions and a cross member 21d connecting the rear end portions 21b of the left and right arm main bodies 21c to each other. The elements of the upper arm 21 are, for example, aluminum parts and are formed integrally.

The left and right arm main bodies 21c are arranged on left and right sides of the upper portion of the supporting member 15. The left and right arm main bodies 21c curve inward in the vehicle width directions, along an outer wall surface of the upper portion of the supporting member 15. The cross member 21d extends in the vehicle width directions behind the upper portion of the supporting member 15. Both end portions of the cross member 21d are joined to the rear end portions 21b of the left and right arm main bodies 21c, respectively.

Insertion holes 23h opened in the vehicle width directions are formed in the front end portions 21a of the left and right arm main bodies 21c. The bolt 23a is screwed and fastened to a nut 23b while passing through the insertion holes 23h and an inner peripheral portion of the upper connection portion 15c of the supporting member 15, with the upper connection portion 15c interposed between the front end portions 21a of the left and right arm main bodies 21c. A pair of left and right side collars 23j for supporting a pair of left and right needle bearings 23m, a center collar 23i for securing the distance between the left and right side collars 23j, and a ball bearing 23g configured to receive thrust via the right side collar 23j and the center collar 23i are provided on an outer periphery of the bolt 23a. The upper connection portion 15c of the supporting member 15 is supported by the front end portions 21a of the upper arm 21 via the left and right side collars 23j, the center collar 23i, and the ball bearing 23g to be turnable about the first connection axis C11.

Insertion holes 24h opened in the vehicle width directions are formed in the upper connection portions 3a of the left and right front blocks 3L, 3R. An adjustment collar 24k for adjusting left and right gaps are provided in the upper connection portion 3a of the left front block 3L. The bolt 24a is screwed and fastened to a nut 24b while passing through the insertion holes 24h and inner peripheral portions of the rear end portions 21b (rear end portions 21b of the left and right arm main bodies 21c and the cross member 21d) of the upper arm 21, with the rear end portions 21b of the upper arm 21 interposed between the upper connection portions 3a of the left and right front blocks 3L, 3R. A pair of left and right side collars 24j for supporting a pair of left and right needle bearings 24m, a center collar 24i for securing the distance between the left and right side collars 24j, and a ball bearing 24g configured to receive thrust via the right side collar 24j and the center collar 24i are provided on an outer periphery of the bolt 24a. The rear end portions 21b of the upper arm 21 are supported by the upper connection portions 3a of the left and right front blocks 3L, 3R via the left and right side collars 24j, the center collar 24i, and the ball bearing 24g to be turnable about the second connection axis C12.

<Lower Arm>

Referring also to FIG. 6, the lower arm 22 integrally includes a pair of left and right arm main bodies 22c extending in the front-rear directions, a front cross member 22e connecting the front end portions 22a of the left and right arm main bodies 22c to each other, and a rear cross member 22d connecting the rear end portions 22b of the left and right arm main bodies 22c to each other. The elements of the lower arm 22 are, for example, aluminum parts and are formed integrally.

The left and right arm main bodies 22c are arranged on left and right sides of a lower portion of the cushion member 27. The left and right arm main bodies 22c curve inward in the vehicle width directions, along an outer peripheral surface of the lower portion of the cushion member 27 (spring 27k to be described later). Spaces 22s curved inward in the vehicle width directions are formed inside the left and right arm main bodies 22c.

The front cross member 22e extends in the vehicle width directions in front of the lower portion of the cushion member 27. Both end portions of the front cross member 22e are joined to the front end portions 22a of the left and right arm main bodies 22c, respectively.

The rear cross member 22d extends in the vehicle width directions behind the lower portion of the cushion member 27. Both end portions of the rear cross member 22d are joined to the rear end portions 22b of the left and right arm main bodies 22c, respectively.

Insertion holes 25h opened in the vehicle width directions are formed in the left and right lower connection portions 15d which protrude rearward from a rear left portion and a rear right portion of the supporting member 15. The bolt 25a is screwed and fastened to a nut 25b while passing through the insertion holes 25h and inner peripheral portions of the front end portions 22a of the left and right arm main bodies 22c (front end portions 22a of the left and right arm main bodies 22c and the front cross member 22e), with the front end portions 22a of the left and right arm main bodies 22c interposed between the left and right lower connection portions 15d. A pair of left and right side collars 25j for supporting a pair of left and right needle bearings 25m, a center collar 25i for securing the distance between the left and right side collars 25j, and a ball bearing 25g configured to receive thrust via the right side collar 25j and the center collar 25i are provided on an outer periphery of the bolt 25a. The left and right lower connection portions 15d of the supporting member 15 are supported by the front end portions 22a of the lower arm 22 via the left and right side collars 25j, the center collar 25i, and the ball bearing 25g to be turnable about the third connection axis C13.

Insertion holes 26h opened in the vehicle width directions are formed in the lower connection portions 3b of the left and right extending portions 30L, 30R. An adjustment collar 26k for adjusting left and right gaps are provided in the lower connection portion 3b of the left extending portion 30L. The bolt 26a is screwed and fastened to a nut 26b while passing through the insertion holes 26h and inner peripheral portions of the rear end portions 22b (rear end portions 22b of the left and right arm main body 22c and the rear cross member 22d) of the lower arm 22, with the rear end portions 22b of the lower arm 22 interposed between the lower connection portions 3b of the left and right extending portions 30L, 30R. A pair of left and right side collars 26j for supporting a pair of left and right needle bearings 26m, a center collar 26i for securing the distance between the left and right side collars 26j, and a ball bearing 26g configured to receive thrust via the right side collar 26j and the center collar 26i are provided on an outer periphery of the bolt 26a. The rear end portions 22b of the lower arm 22 are supported by the lower connection portions 3b of the left and right extending portions 30L, 30R via the left and right side collars 26j, the center collar 26i, and the ball bearing 26g to be turnable about the fourth connection axis C14.

In the lower arm 22, a recess portion 22h open upward and rearward is formed in the front end portions 22a of the left and right arm main bodies 22c, behind a center portion of the front cross member 22e in the vehicle width directions. A lower end portion 27b (a second cushion end 27b) of the cushion member 27 is housed in the recess portion 22h. Moreover, cushion lower connection portions 27d to which the lower end portion 27b of the cushion member 27 is connected are formed in portions of the front end portions 22a of the left and right arm main bodies 22c which face the recess portion 22h.

<Cushion Member>

Referring also to FIG. 1, the cushion member 27 includes a rod damper 27j inclining rearward as extending upward in the side view and the coil spring 27k wound around the damper 27j. The cushion member 27 is expanded and compressed in its stroke along the center axis C3 and thereby provides a predetermined cushioning effect. Hereafter, the center axis C3 is referred to as "stroke axis." The cushion upper connection portions 27c are arranged behind the steering axis C1 such that that the stroke axis C3 is inclined rearward with respect to the vertical direction in the side view.

The cushion member 27 provides the cushioning effect by causing the lower end portion 27b to move in its stroke with swinging of the lower arm 22. The cushion member 27 is arranged in front of and above the engine and behind and above the front wheel 11 in the side view. An upper portion of the cushion member 27 is housed in the lower open portion 3s in the gate shape of the front blocks 3. The upper end portion 27a of the cushion member 27 is covered with the front blocks 3 in the side view. The upper end portion 27a of the cushion member 27 is swingably connected to the cushion upper connection portions 27c (see FIG. 5) of the left and right extending portions 33L, 33R, and the lower end portion 27b of the cushion member 27 is swingably connected to the cushion lower connection portions 27d (see FIG. 6) of the lower arm 22.

Referring to FIG. 5, the upper end portion 27a of the cushion member 27 is swingably connected to the cushion upper connection portions 27c of the left and right extending portions 33L, 33R via the bolt 34a serving as the connection shaft extending in the vehicle width directions. The bolt 34a penetrates the cushion upper connection portions 27c and the upper end portion 27a of the cushion member 27 and extends in the vehicle width directions. Reference sign C15 denotes the center axis of the bolt 34a connecting the cushion upper connection portions 27c and the upper end portion 27a of the cushion member 27 to each other.

Insertion holes 34h opened in the vehicle width directions are formed in the cushion upper connection portions 27c of the left and right extending portions 33L, 33R. The bolt 34a is inserted through the insertion holes 34h and an inner peripheral portion of the upper end portion 27a of the cushion member 27 with the upper end portion 27a of the cushion member 27 interposed between the cushion upper connection portions 27c of the left and right extending portions 33L, 33R, and a nut 34b is screwed and fastened to a protruding portion of the bolt 34a. A collar 34j for supporting a needle bearing 34m is provided on an outer periphery of the bolt 34a. The upper end portion 27a of the cushion member 27 is supported by the cushion upper connection portions 27c of the left and right extending portions 33L, 33R via the collar 34j to be turnable about the center axis C15.

Referring to FIG. 6, the lower end portion 27b of the cushion member 27 is swingably connected to the left and right cushion lower connection portions 27d of the lower arm 22 via a bolt 28a serving as a connection shaft extending in the vehicle width directions. The bolt 28a penetrates the cushion lower connection portions 27d and the lower end portion 27b of the cushion member 27 and extends in the vehicle width directions. Reference sign C16 denotes the center axis of the bolt 28a connecting the cushion lower connection portions 27d and the lower end portion 27b of the cushion member 27 to each other.

Insertion holes 28h opened in the vehicle width directions are formed in the left and right cushion lower connection portions 27d of the lower arm 22. The bolt 28a is inserted through the insertion holes 28h and an inner peripheral portion of the lower end portion 27b of the cushion member 27 with the lower end portion 27b of the cushion member 27 interposed between the left and right cushion lower connection portions 27d of the lower arm 22, and a nut 28b is screwed and fastened to a protruding portion of the bolt 28a. A collar 28j for supporting a needle bearing 28m is provided on an outer periphery of the bolt 28a. The lower end portion 27b of the cushion member 27 is supported by the left and right cushion lower connection portions 27d of the lower arm 22 via the collar 28j to be turnable about the center axis C16.

Operations of the cushion member 27 are described below.

When front wheel braking or the like causes the front wheel 11 to be relatively displaced upward from a position thereof at a one-G state where load corresponding the weight of the vehicle is applied to the front wheel suspension device 1, the supporting arm 20 swings upward, and the front fork 17 and the supporting member 15 are displaced upward. At this time, the lower arm 22 turns in a right-handed direction (clockwise) in FIG. 1 about the fourth connection axis C14. Then, the lower arm 22 displaces the lower end portion 27b of the cushion member 27 upward and compress the cushion member 27.

When the supporting member 15 is displaced upward, the steering member 45 is also displaced together with the displacement of the supporting member 15. At this time, the link members 40 are displaced relative to the handle post 35, and the angle of the steered axis C2 relative to the steering axis C1 changes. However, this change is absorbed by the swinging of the front and rear ball joints 41, 42 and the swinging of the link members 40.

Meanwhile, when acceleration or the like causes the front wheel 11 to be relatively displaced downward from the position thereof at the one-G state, the supporting arm 20 swings downward, and the front fork 17 and the supporting member 15 are displaced downward. At this time, the lower arm 22 turns in a left-handed direction (counterclockwise) in FIG. 1 about the fourth connection axis C14. Then, the lower arm 22 displaces the lower end portion 27b of the cushion member 27 downward and expand the cushion member 27.

When the supporting member 15 is displaced downward, the steering member 45 is also displaced together with the displacement of the supporting member 15. At this time, the link members 40 are displaced relative to the handle post 35, and the angle of the steered axis C2 relative to the steering axis C1 changes. However, this change is absorbed by the swinging of the front and rear ball joints 41, 42 and the swinging of the link members 40.

Figure 7:
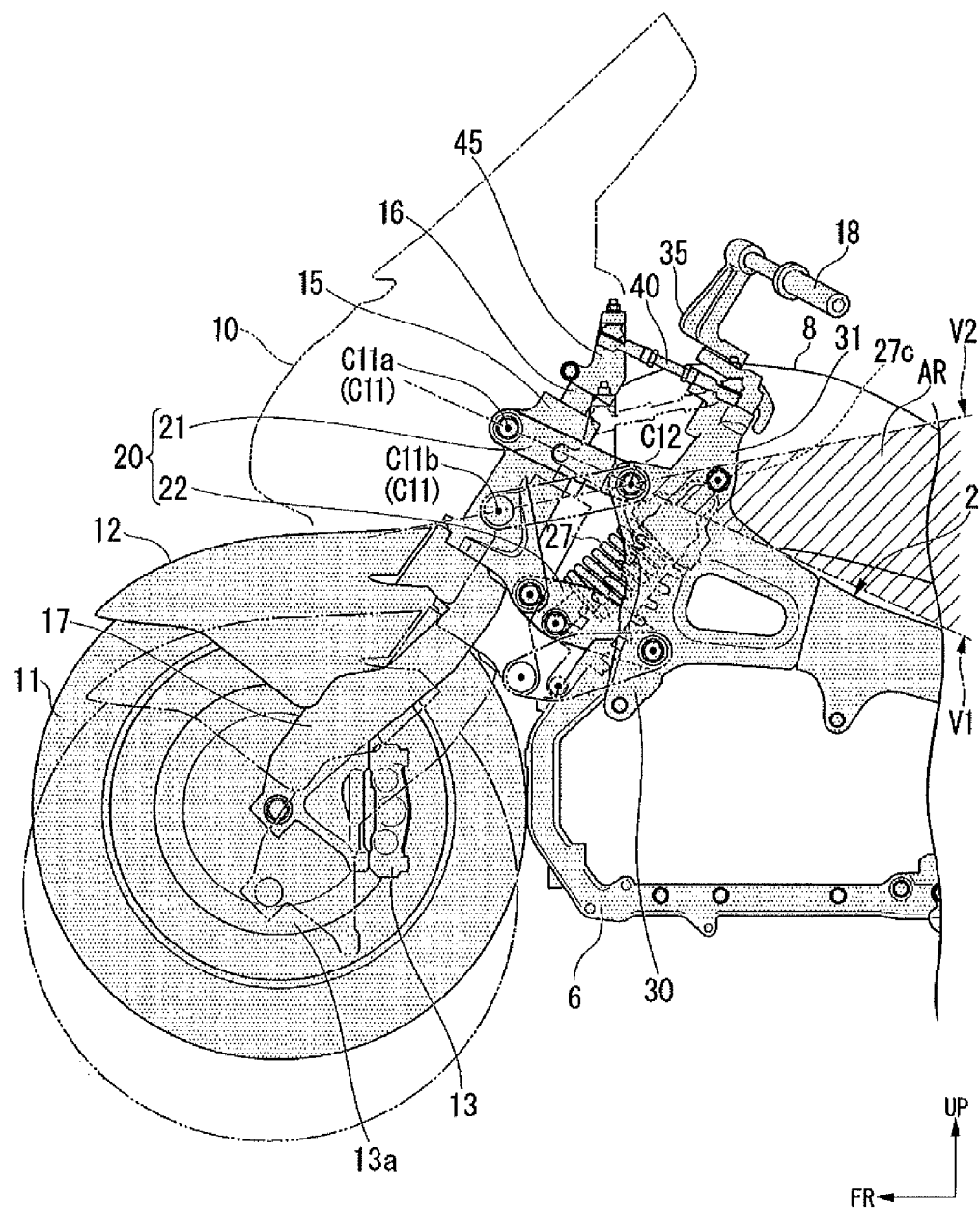
FIG. 7 is a view for exampling an arrangement position of a connection portion between the aforementioned upper end portion of the cushion member and a handle supporting portion.

Arrangement positions of the cushion upper connection portions 27c are described below. In FIG. 7, the elements of the vehicle front portion in the situation where the front wheel 11 is relatively displaced upward (the upper arm 21 swings upward) are illustrated by being shaded by dots for convenience.

Referring to FIG. 7, the first connection axis C11, which is the center axis of the bolt 23a, in the situation where the front wheel 11 is relatively displaced upward (the upper arm 21 swings upward) in the side view is referred to as "upper axis C11a," while the first connection axis C11, which is the center axis of the bolt 23a, in the situation where the front wheel 11 is relatively displaced downward (the upper arm 21 swings downward) in the side view is referred to as "lower axis C11b." A straight line passing through the upper axis C11a and the second connection axis C12 in the side view is referred to as "upper straight line V1," and a straight line passing through the lower axis C11b and the second axis C12 in the side view is referred to as "lower straight line V2." The upper and lower straight lines V1, V2 form a fan-shaped imaginary region AR behind the second connection axis C12 in the side view with upward and downward movements of the front wheel 11. The cushion upper connection portions 27c are arranged inside the imaginary region AR in the side view.

As described above, in the aforementioned embodiment, there is provided the front wheel supporting frame structure of the motorcycle including: the main frames 2 which extend in the vehicle front-rear directions; the upper and lower arms 21, 22 which extend in the vehicle front-rear directions and by which the front wheel 11 is supported to be swingable in the up-down directions; and the cushion member 27 which is expanded and compressed according to the movement of the front wheel 11 to provide the cushioning effect. In the front wheel supporting frame structure, the upper connection portions 3a to which the rear end portions 21b of the upper arm 21 are swingably connected are formed in the upper front portions of the main frames 2, the lower connection portions 3b to which the rear end portions 22b of the lower arm 22 are swingably connected are formed in the lower front portions of the main frames 2, the handle supporting portion 31 by which the bar handle 18 is supported to be turnable about the steering axis C1 is formed to extend upward in the upper front portions of the main frames 2, behind the upper connection portions 3a, the upper end portion 27a of the cushion member 27 is swingably connected to the handle supporting portion 31, and the lower end portion 27b of the cushion member 27 is swingably connected to the lower arm 22.

In this configuration, the handle supporting portion 31 by which the bar handle 18 is supported to be turnable about the steering axis C1 is formed to extend upward in the upper front portions of the main frames 2, behind the upper connection portions 3a. This allows the position of the handle to be set closer to the rider than that in the case where the handle supporting portion 31 is provided in front of the upper connection portions 3a. Accordingly, the operability of the bar handle 18 (handle) can be improved. Moreover, the upper end portion 27a of the cushion member 27 is swingably connected to the handle supporting portion 31. This can secure a longer stroke of the cushion member 27 than that in the case where the cushion member 27 is arranged on the turning axis of the front fork 17, thereby improving the ride quality of the vehicle. Hence, it is possible to improve the operability of the bar handle 18 and also improve the ride quality of the vehicle. Furthermore, the upper end portion 27a of the cushion member 27 is swingably connected to the handle supporting portion 31. This allows two members to use the same attachment portion. Accordingly, the weight of the frame can be reduced compared to the case where an additional member for connecting the upper end portion 27a of the cushion member 27 is provided.

Moreover, in the aforementioned embodiment, the bolt 34a (connection shaft) extending in the vehicle width directions and connecting the left and right extending portions 33L, 33R to each other is provided in the left and right extending portions 33L, 33R. This can achieve reinforcement of the left and right extending portions 33L, 33R with the bolt 34a. Accordingly, it is possible to improve the stiffness of the handle supporting portion 31 and improve the ride quality of the vehicle.

Furthermore, in the aforementioned embodiment, the upper end portion 27a of the cushion member 27 is swingably connected to the handle supporting portion 31 via the bolt 34a. This allows the same member to be used as a reinforcement member of the left and right extending portions 33L, 33R and an attachment portion of the upper end portion 27a of the cushion member 27. Accordingly, the weight of the frame can be reduced compared to the case where an additional member for connecting the upper end portion 27a of the cushion member 27 is provided.

Moreover, in the aforementioned embodiment, the handle post 35 includes the holder 36 to which the bar handle 18 is fixed and the shaft portion 39 which is connected to the lower portion of the holder 36 and whose center axis coincides with the steering axis C1. This allows the handle operation to be transmitted to the front wheel 11 by utilizing the shaft portion 39 connected to the lower portion of the holder 36 of the handle post 35. Accordingly, the handle operability and the ride quality of the vehicle can be improved.

Furthermore, in the aforementioned embodiment, the shaft portion 39 is supported by the boss portion 32, inside the boss portion 32 in the radial direction thereof, to be turnable about the steering axis C1. Accordingly, the handle post 35 and the handle supporting portion 31 can be arranged in a compact manner.

Moreover, in the aforementioned embodiment, the cushion upper connection portions 27c are arranged in the imaginary region AR in the side view. This can reduce stress applied to the frame by reaction force of the cushion member 27 compared to the case where the cushion upper connection portions 27c are arranged outside the imaginary region AR in the side view. Accordingly, it is possible to suppress vibrations of the frame and improve the ride quality of the vehicle.

Furthermore, in the aforementioned embodiment, the cushion upper connection portions 27c are arranged behind the steering axis C1 such that the stroke axis C3 is inclined rearward with respect to the vertical direction in the side view. This can suppress vibrations of the handle supporting portion 31 which occur with input from the cushion member 27, compared to the case where the cushion upper connection portions 27c are arranged in front of the steering axis C1 such that the stroke axis C3 extends in the vertical direction in the side view, thereby improving the ride quality of the vehicle.

Moreover, in the aforementioned embodiment, the cover member 60 covering the portion above the handle post 35 in the top view is further provided. The handle post 35 can be thereby hidden by the cover member 60 in the top view and is less visible from the outside. Accordingly, the external appearance can be improved.

Note that, in the aforementioned embodiment, description is given of the example in which the steered axis C2 is arranged in front of and away from the steering axis C1 in the side view. However, an embodiment of the present invention is not limited to this example. For example, the steered axis C2 may be arranged behind and away from the steering axis C1 in the side view. In other words, it is only necessary that the steered axis C2 and the steering axis C1 are offset from each other in the front-rear directions in the side view. Moreover, the steered axis C2 and the steering axis C1 may coincide with each other in the side view.

Moreover, in the aforementioned embodiment, description is given of the example in which the steered axis C2 and the steering axis C1 are parallel to each other. However, an embodiment of the present invention is not limited to this example. For example, the steered axis C2 and the steering axis C1 may intersect each other.

Furthermore, in the aforementioned embodiment, the description is given of the example in which the first straight line AX1 of the upper arm 21 and the second straight line AX2 of the lower arm 22 are substantially parallel to each other. However, an embodiment of the present invention is not limited to this example.

For example, the first straight line AX1 and the second straight line AX2 can intersect each other in portions extending behind the upper arm 21 such that the distance between the first straight line AX1 of the upper arm 21 and the second straight line AX2 of the lower arm 22 increases toward the front side. In order to achieve such intersecting arrangement, for example, the position of the second connection axis C12 in the up-down directions is shifted downward or the position of the fourth connection axis C14 in the up-down directions is shifted upward in the side view.

Alternatively, the first straight line AX1 and the second straight line AX2 can intersect each other in portions extending in front of the upper arm 21 and the lower arm 22 such that the distance between the first straight line AX1 of the upper arm 21 and the second straight line AX2 of the lower arm 22 increases toward the rear side. In order to achieve such intersecting arrangement, for example, the position of the second connection axis C12 in the up-down directions is shifted upward or the position of the fourth connection axis C14 in the up-down directions is shifted downward in the side view.

Moreover, in the aforementioned embodiment, description is given of the example in which the first axes C4 are the straight lines extending in the vehicle up-down directions and the second axis C5 is the straight line substantially parallel to the first axes C4 and extending in the vehicle up-down directions. However, an embodiment of the present invention is not limited to this example. For example, the first and second axes C4, C5 may be such that the first axes C4 are straight lines extending in directions intersecting the vehicle width directions and the second axis C5 is a straight line extending in directions which intersect the vehicle width directions but are different from the directions of the first axes C4.

Note that an embodiment of the present invention is not limited to the aforementioned embodiment. For example, the saddle-ride type vehicle includes vehicles in general on which a driver rides by straddling on a vehicle body and includes not only motorcycles (including motored bicycles and scooter-type vehicles) but also three-wheel vehicles (including vehicles with two front wheels and one rear wheel in addition to vehicles with one front wheel and two rear wheel).

Moreover, the configuration in the aforementioned embodiment is one example of the present invention, and various changes such as replacing the constitutional elements in the embodiment with other well-known constitutional elements can be made within a range not departing from the spirit of the present invention.

For the purpose of solving the above-mentioned problems, a first aspect of the present invention provides a front wheel supporting frame structure of a saddle-ride type vehicle, comprising: a main frame (2) which extends in vehicle front-rear directions; upper and lower arms (21, 22) which extend in the vehicle front-rear directions and by which a front wheel (11) is supported to be swingable in up-down directions; and a cushion member (27) which is expanded and compressed according to a movement of the front wheel (11) to provide a cushioning effect, wherein an upper connection portion (3a) to which a rear end portion (21b) of the upper arm (21) is swingably connected is formed in an upper front portion of the main frame (2), a lower connection portion (3b) to which a rear end portion (22b) of the lower arm (22) is swingably connected is formed in a lower front portion of the main frame (2), a handle supporting portion (31) by which a handle (18) is supported to be turnable about a steering axis (C1) is formed to extend upward in the upper front portion of the main frame (2), behind the upper connection portion (3a), an upper end portion (27a) of the cushion member (27) is swingably connected to the handle supporting portion (31), and a lower end portion (27b) of the cushion member (27) is swingably connected to the lower arm (22).

In a second aspect of the present invention, the handle supporting portion (31) includes a tubular boss portion (32) which forms the steering axis (C1) and left and right extending portions (33L, 33R) which extend upward from the upper front portion of the main frame (2) as inclining inward in vehicle width directions to be connected to a lower portion (32b) of the boss portion (32), and a connection shaft (34a) which extends in the vehicle width directions to connect the left and right extending portions (33L, 33R) to each other is provided in the left and right extending portions (33L, 33R).

In a third aspect of the present invention, the upper end portion (27a) of the cushion member (27) is swingably connected to the handle supporting portion (31) via the connection shaft (34a).

In a fourth aspect of the present invention, a handle post (35) is provided in an upper portion (32) of the boss portion (32) to be turnable about the steering axis (C1), and the handle post (35) includes a holder (36) to which the handle (18) is fixed and a shaft portion (39) which is connected to a lower portion of the holder (36) and which has a center axis coinciding with the steering axis (C1).

In a fifth aspect of the present invention, the shaft portion (39) is supported by the boss portion (32), inside the boss portion (32) in a radial direction thereof, to be turnable about the steering axis (C1).

In a sixth aspect of the present invention, a front end portion (21a) of the upper arm (21) is connected to a member (15) on the front wheel (11) side to be swingable about a first connection axis (C11) extending in the vehicle width directions, the rear end portion (22a) of the upper arm (21) is connected to the upper front portion of the main frame (2) to be swingable about a second connection axis (C12) extending in the vehicle width directions, a straight line (V1, V2) passing through the first connection axis (C11) and the second connection axis (C12) forms a fan-shaped imaginary region (AR) behind the second connection axis (C12) in a side view with up and down movements of the front wheel (11), a connection portion (27c) between the upper end portion (27a) of the cushion member (27) and the handle supporting portion (31) is arranged inside the imaginary region (AR) in the side view.

In a seventh aspect of the present invention, a connection portion (27c) between the upper end portion (27a) of the cushion member (27) and the handle supporting portion (31) is arranged behind the steering axis (C1) such that a stroke axis (C3) of the cushion member (27) is inclined rearward with respect to a vertical direction in the side view.

In an eighth aspect of the present invention, a handle post (35) is provided above the handle supporting portion (31) to be turnable about the steering axis (C1); and the front wheel supporting frame structure further comprises a cover member (60) covering a portion above the handle post (35) in the top view.

According to the first aspect of the present invention, the handle supporting portion by which the handle is supported to be turnable about the steering axis is formed to extend upward in the upper front portion of the main frame, behind the upper connection portion. This allows the position of the handle to be set closer to the rider than that in the case where the handle supporting portion is provided in front of the upper connection portion. Accordingly, the operability of the handle can be improved. Moreover, the upper end portion of the cushion member is swingably connected to the handle supporting portion. This can secure a longer stroke of the cushion member than that in the case where the cushion member is arranged on the turning axis of the front fork, thereby improving the ride quality of the vehicle. Hence, it is possible to improve the operability of the handle and also improve the ride quality of the vehicle. Furthermore, the upper end portion of the cushion member is swingably connected to the handle supporting portion. This allows two members to use the same attachment portion. Accordingly, the weight of the frame can be reduced compared to the case where an additional member for connecting the upper end portion of the cushion member is provided.

According to the second aspect of the present invention, the connection shaft extending in the vehicle width directions and connecting the left and right extending portions to each other is provided in the left and right extending portions. This can achieve reinforcement of the left and right extending portions with the connection shaft. Accordingly, it is possible to improve the stiffness of the handle supporting portion and improve the ride quality of the vehicle.

According to the third aspect of the present invention, the upper end portion of the cushion member is swingably connected to the handle supporting portion via the connection shaft. This allows the same member to be used as a reinforcement member of the left and right extending portions and an attachment portion of the upper end portion of the cushion member. Accordingly, the weight of the frame can be reduced compared to the case where an additional member for connecting the upper end portion of the cushion member is provided.

According to the fourth aspect of the present invention, the handle post includes the holder to which the handle is fixed and the shaft portion which is connected to the lower portion of the holder and which has the center axis coinciding with the steering axis. This allows the handle operation to be transmitted to the front wheel by utilizing the shaft portion connected to the lower portion of the holder of the handle post. Accordingly, the handle operability and the ride quality of the vehicle can be improved.

According to the fifth aspect of the present invention, the shaft portion is supported by the boss portion, inside the boss portion in the radial direction thereof, to be turnable about the steering axis. Accordingly, the handle post and the handle supporting portion can be arranged in a compact manner.

According to the sixth aspect of the present invention, the connection portion between the upper end portion of the cushion member and the handle supporting portion is arranged in the imaginary region in the side view. This can reduce stress applied to the frame by reaction force of the cushion member compared to the case where the connection portion between the upper end portion of the cushion member and the handle supporting portion is arranged outside the imaginary region in the side view. Accordingly, it is possible to suppress vibrations of the frame and improve the ride quality of the vehicle.

According to the seventh aspect of the present invention, the connection portion between the upper end portion of the cushion member and the handle supporting portion is arranged behind the steering axis such that the stroke axis of the cushion member is inclined rearward with respect to the vertical direction in the side view. This can suppress vibrations of the handle supporting portion which occur with input from the cushion member, compared to the case where the connection portion is arranged in front of the steering axis such that the stroke axis extends in the vertical direction in the side view, thereby improving the ride quality of the vehicle.

According to the eighth aspect of the present invention, the cover member covering the portion above the handle post in the top view is further provided. The handle post can be thereby hidden by the cover member in the top view and is less visible from the outside. Accordingly, the external appearance can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A front wheel supporting frame structure of a saddle-ride vehicle, comprising:
a main frame which extends in vehicle front-rear directions;
upper and lower arms which extend in the vehicle front-rear directions and by which a front wheel is supported to be swingable in up-down directions; and
a cushion member which is expanded and compressed according to a movement of the front wheel to provide a cushioning effect, wherein
an upper connection portion formed in an upper front portion of the main frame, a rear end portion of the upper arm being swingably directly connected to the upper connection portion formed in the upper front portion of the main frame,
a lower connection portion to which a rear end portion of the lower arm is swingably connected is formed in a lower front portion of the main frame,
a handle supporting portion by which a handle is supported to be turnable about a steering axis is formed to extend upward in the upper front portion of the main frame, behind the upper connection portion,
an upper end portion of the cushion member is swingably connected to the handle supporting portion, and
a lower end portion of the cushion member is swingably connected to the lower arm.

2. The front wheel supporting frame structure according to claim 1, wherein
the upper end portion of the cushion member is swingably connected to the handle supporting portion about a first axis,
the rear end portion of the upper arm is swingably connected to the upper connection portion about a second axis, and
the first axis is offset from the second axis.

3. A front wheel supporting frame structure of a saddle-ride vehicle, comprising:
a main frame which extends in vehicle front-rear directions;
upper and lower arms which extend in the vehicle front-rear directions and by which a front wheel is supported to be swingable in up-down directions; and
a cushion member which is expanded and compressed according to a movement of the front wheel to provide a cushioning effect, wherein
an upper connection portion to which a rear end portion of the upper arm is swingably connected is formed in an upper front portion of the main frame,
a lower connection portion to which a rear end portion of the lower arm is swingably connected is formed in a lower front portion of the main frame,
a handle supporting portion by which a handle is supported to be turnable about a steering axis is formed to extend upward in the upper front portion of the main frame, behind the upper connection portion,
an upper end portion of the cushion member is swingably connected to the handle supporting portion, and
a lower end portion of the cushion member is swingably connected to the lower arm, wherein
the handle supporting portion includes a tubular boss portion which forms the steering axis and left and right extending portions which extend upward from the upper front portion of the main frame as inclining inward in vehicle width directions to be connected to a lower portion of the boss portion, and
a connection shaft which extends in the vehicle width directions to connect the left and right extending portions to each other is provided in the left and right extending portions.

4. The front wheel supporting frame structure according to claim 3, wherein the upper end portion of the cushion member is swingably connected to the handle supporting portion via the connection shaft.

5. The front wheel supporting frame structure according to claim 3, wherein
a handle post is provided in an upper portion of the boss portion to be turnable about the steering axis, and
the handle post includes a holder to which the handle is fixed and a shaft portion which is connected to a lower portion of the holder and which has a center axis coinciding with the steering axis.

6. The front wheel supporting frame structure according to claim 5, wherein the shaft portion is supported by the boss portion, inside the boss portion in a radial direction thereof, to be turnable about the steering axis.

7. A front wheel supporting frame structure of a saddle-ride vehicle, comprising:
a main frame which extends in vehicle front-rear directions;
upper and lower arms which extend in the vehicle front-rear directions and by which a front wheel is supported to be swingable in up-down directions; and
a cushion member which is expanded and compressed according to a movement of the front wheel to provide a cushioning effect, wherein
an upper connection portion to which a rear end portion of the upper arm is swingably connected is formed in an upper front portion of the main frame,
a lower connection portion to which a rear end portion of the lower arm is swingably connected is formed in a lower front portion of the main frame,
a handle supporting portion by which a handle is supported to be turnable about a steering axis is formed to extend upward in the upper front portion of the main frame, behind the upper connection portion,
an upper end portion of the cushion member is swingably connected to the handle supporting portion, and
a lower end portion of the cushion member is swingably connected to the lower arm, wherein a front end portion of the upper arm is connected to a member on the front wheel side to be swingable about a first connection axis extending in the vehicle width directions, the rear end portion of the upper arm is connected to the upper front portion of the main frame to be swingable about a second connection axis extending in the vehicle width directions, a straight line passing through the first connection axis and the second connection axis forms a fan-shaped imaginary region behind the second connection axis in a side view with up and down movements of the front wheel, a connection portion between the upper end portion of the cushion member and the handle supporting portion is arranged inside the imaginary region in the side view.

8. A front wheel supporting frame structure of a saddle-ride vehicle, comprising:

a main frame which extends in vehicle front-rear directions;

upper and lower arms which extend in the vehicle front-rear directions and by which a front wheel is supported to be swingable in up-down directions; and a cushion member which is expanded and compressed according to a movement of the front wheel to provide a cushioning effect, wherein an upper connection portion to which a rear end portion of the upper arm is swingably connected is formed in an upper front portion of the main frame, a lower connection portion to which a rear end portion of the lower arm is swingably connected is formed in a lower front portion of the main frame, a handle supporting portion by which a handle is supported to be turnable about a steering axis is formed to extend upward in the upper front portion of the main frame, behind the upper connection portion, an upper end portion of the cushion member is swingably connected to the handle supporting portion, and a lower end portion of the cushion member is swingably connected to the lower arm, wherein a connection portion between the upper end portion of the cushion member and the handle supporting portion is arranged behind the steering axis such that a stroke axis of the cushion member is inclined rearward with respect to a vertical direction in a side view.

9. A front wheel supporting frame structure of a saddle-ride vehicle, comprising:

a main frame which extends in vehicle front-rear directions;

upper and lower arms which extend in the vehicle front-rear directions and by which a front wheel is supported to be swingable in up-down directions; and a cushion member which is expanded and compressed according to a movement of the front wheel to provide a cushioning effect, wherein an upper connection portion to which a rear end portion of the upper arm is swingably connected is formed in an upper front portion of the main frame, a lower connection portion to which a rear end portion of the lower arm is swingably connected is formed in a lower front portion of the main frame, a handle supporting portion by which a handle is supported to be turnable about a steering axis is formed to extend upward in the upper front portion of the main frame, behind the upper connection portion, an upper end portion of the cushion member is swingably connected to the handle supporting portion, and a lower end portion of the cushion member is swingably connected to the lower arm, wherein a handle post is provided above the handle supporting portion to be turnable about the steering axis; and the front wheel supporting frame structure further comprises a cover member covering a portion above the handle post in a top view.

10. A front wheel supporting frame structure of a saddle-ride vehicle, comprising:

a front fork supporting a front wheel to be rotatable around a first rotational axis;

a front fork supporting member supporting the front fork to be turnable about a second rotational axis;

a main frame on which a saddle is disposed and which includes a handle supporting portion disposed between the front fork and the saddle, the handle supporting portion supporting a handle post to be turnable about a third rotational axis different from the second rotational axis, the front fork being turnable with the handle post;

a cushion member connected to the main frame at or below the handle supporting portion such that the cushion member is swingable with respect to the main frame about a fourth rotation axis to be expanded and compressed according to a movement of the front wheel, the fourth rotation axis being provided to be substantially perpendicular to a plane including the second rotation axis, the cushion member having a first cushion end connected to the main frame and a second cushion end opposite to the first cushion end;

a first arm connected to the front fork supporting member at a first front end portion of the first arm such that the first arm is swingable with respect to the front fork supporting member about a fifth rotation axis which is substantially parallel to the fourth rotation axis, the first arm being connected to the main frame at a first rear end portion of the first arm opposite to the first front end portion such that the first arm is swingable with respect to the main frame about a sixth rotation axis substantially parallel to the fourth rotation axis; and a second arm connected to the front fork supporting member at a second front end portion of the second arm such that the second arm is swingable with respect to the front fork supporting member about a seventh rotation axis substantially parallel to the fourth rotation axis, the second arm being connected to the second cushion end of the cushion member such that the second arm is swingable with respect to the cushion member about an eighth rotation axis substantially parallel to the fourth rotation axis, the second arm being connected to the main frame at a second rear end portion of the second arm opposite to the second front end portion such that the second arm is swingable with respect to the main frame about a ninth rotation axis substantially parallel to the fourth rotation axis.

11. The front wheel supporting frame structure according to claim 10, wherein the second arm is disposed below the first arm, the first arm is connected to an upper front portion of the main frame, the upper front portion being disposed between the front fork and the handle supporting portion, and the second arm is connected to a lower front portion of the main frame, the lower front portion being below the upper front portion.

12. The front wheel supporting frame structure according to claim 11, wherein the handle supporting portion includes a tubular boss portion having a first center axis coinciding with the third rotational axis and left and right extending portions which extend upward from the upper front portion of the main frame as inclining inward in vehicle width directions to be connected to a lower portion of the boss portion, and a connection shaft which extends in the vehicle width directions to connect the left and right extending portions to each other is provided in the left and right extending portions.

13. The front wheel supporting frame structure according to claim 12, wherein
the first cushion end of the cushion member is swingably connected to the handle supporting portion via the connection shaft.

14. The front wheel supporting frame structure according to claim 12, wherein
the handle post is provided in an upper portion of the boss portion to be turnable about the third rotational axis, and
the handle post includes a holder to which the handle is fixed and a shaft portion which is connected to a lower portion of the holder and which has a second center axis coinciding with the third rotational axis.

15. The front wheel supporting frame structure according to claim 14, wherein
the shaft portion is supported by the boss portion, inside the boss portion in a radial direction thereof, to be turnable about the third rotational axis.

16. The front wheel supporting frame structure according to claim 11, wherein
the handle supporting portion is connected to the first cushion end of the cushion member,
a straight line passing through the fifth rotational axis and the six rotational axis forms a fan-shaped imaginary region behind the sixth rotational axis in a side view with up and down movements of the front wheel, and
a connection portion between the first cushion end of the cushion member and the handle supporting portion is arranged inside the imaginary region in the side view.

17. The front wheel supporting frame structure according to claim 10, wherein
the handle supporting portion is connected to the first cushion end of the cushion member,
a connection portion between the first cushion end of the cushion member and the handle supporting portion is arranged behind the third rotational axis such that a stroke axis of the cushion member is inclined rearward with respect to a vertical direction in a side view.

18. The front wheel supporting frame structure according to claim 17, wherein
the handle post is provided above the handle supporting portion to be turnable about the third rotational axis; and
the front wheel supporting frame structure further comprises a cover member covering a portion above the handle post in a top view.

19. The front wheel supporting frame structure according to claim 11, wherein
the main frame extends in vehicle front-rear directions, and the first arm and the second arm extend in vehicle front-rear directions.

20. The front wheel supporting frame structure according to claim 10, wherein
the cushion member is to be expanded and compressed to provide a cushioning effect.

* * * * *